United States Patent
Lienhard et al.

(10) Patent No.: US 6,778,863 B1
(45) Date of Patent: Aug. 17, 2004

(54) INFORMATION TECHNOLOGY SYSTEM FOR THE DEFINITION, OPTIMIZATION AND CONTROL OF PROCESSES

(75) Inventors: Heinz Lienhard, Zug (CH); Bruno Buetler, Sins (CH); Marco Poli, Rotkreuz (CH); Reto Weiss, Kuessnacht (CH); Urs-Martin Kuenzi, Zurich (CH); Mati Pentus, Moscow (RU)

(73) Assignee: IvyTeam AG (CH)

( * ) Notice: Subject to any disclaimer, the term of this patent is extended or adjusted under 35 U.S.C. 154(b) by 358 days.

(21) Appl. No.: 09/590,744

(22) Filed: Jun. 8, 2000

(30) Foreign Application Priority Data

Jun. 11, 1999 (EP) ............................................ 99810520

(51) Int. Cl.[7] .............................................. G05B 13/02
(52) U.S. Cl. ............................. 700/32; 700/83; 700/10; 700/65; 700/28; 700/9; 700/17; 704/8
(58) Field of Search ................................ 704/8; 700/32, 700/83, 10, 65, 28, 9, 17

(56) References Cited

U.S. PATENT DOCUMENTS

| | | | |
|---|---|---|---|
| 4,965,742 A | | 10/1990 | Skeirik |
| 4,967,386 A | | 10/1990 | Maeda et al. |
| 5,495,417 A | | 2/1996 | Fuduka et al. |
| 5,526,268 A | * | 6/1996 | Tkacs et al. ............. 704/8 |
| 5,659,467 A | | 8/1997 | Vickers |
| 5,710,700 A | | 1/1998 | Kurtzberg et al. |
| 5,752,008 A | * | 5/1998 | Bowling ............. 700/83 |
| 5,826,060 A | * | 10/1998 | Santoline et al. ........ 700/10 |
| 5,838,595 A | | 11/1998 | Sullivan et al. |
| 5,841,652 A | * | 11/1998 | Sanchez ............ 700/32 |
| 6,311,144 B1 | * | 10/2001 | Abu El Ata ............. 703/2 |

FOREIGN PATENT DOCUMENTS

DE 196 39 424 3/1997

OTHER PUBLICATIONS

Ball S: "XML Support for TCL" Proceedings of the Sixth Annual TCL/TK Conference, Sep. 18, 1998, Seiten 109–119–119.

P. Martin "The Development of an Object–Oriented, Discrete–Event Simulation Language Using Java", Dec. 2, 1997.

D.Nicol et al.: The Ides Framework: A Case Study in Development . . . , Dec. 7, 1997.

* cited by examiner

Primary Examiner—Ramesh Patel
Assistant Examiner—Thomas Pham
(74) Attorney, Agent, or Firm—Bachman & LaPointe, P.C.

(57) ABSTRACT

The invention relates to a computer application in the field of control, monitoring, modification and/or optimization of processes which comprise real process sequences of discrete events, so-called "discrete event dynamic systems", which cannot usually be described by systems of (differential) equations. Such processes occur for example in technical developments as well as in other business activities in the industrial or tertiary sector. Such a real process is reflected in a process model which is connected to the real process via at least one interface. If the interface(s) is/are bi-directional, real process data can be transmitted into the model directly, i.e. without data conversion, and thus the real process can be monitored; in the model, simulations can be carried out with changed process data; and finally if the result of the simulation is successful, process modifications can be transferred directly to the real process.

9 Claims, 3 Drawing Sheets

Figure 1:
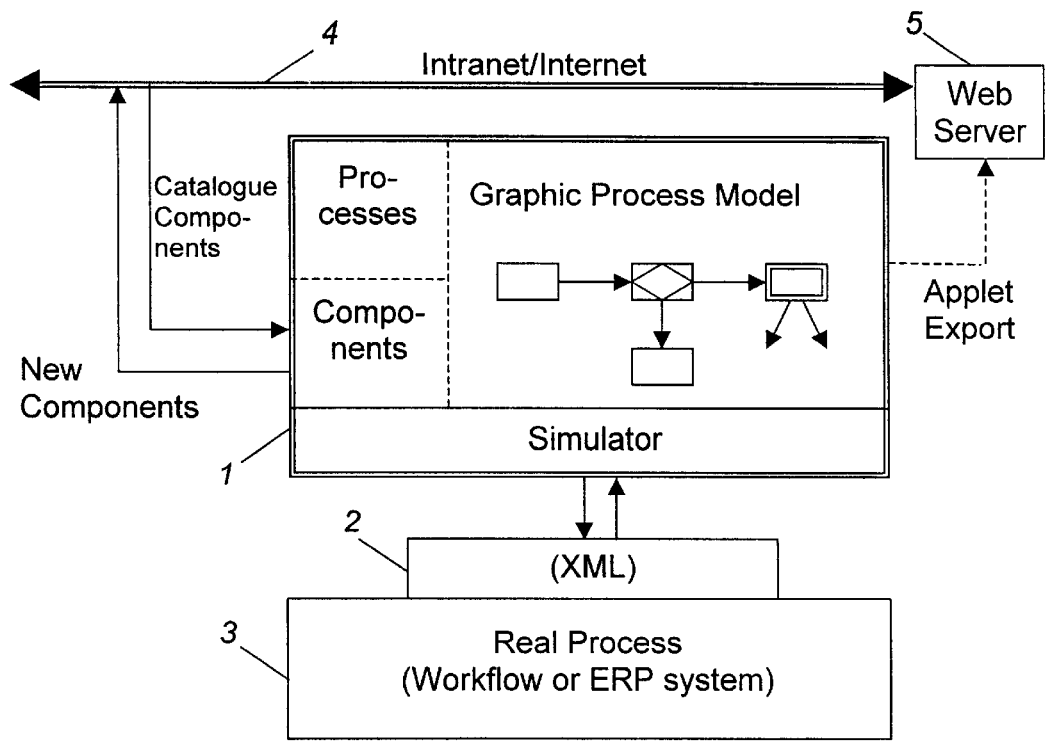

INFORMATION TECHNOLOGY SYSTEM FOR THE DEFINITION, OPTIMIZATION AND CONTROL OF PROCESSES

TECHNICAL FIELD OF THE INVENTION

The invention relates to the field of computer applications to simulate and/or control real processes, in particular processes which comprise sequences of discrete events, known as discrete event dynamic systems (DEDS). Such processes occur for example in technical developments as well as in other business activities in the industrial or tertiary sector. Also, the behaviour of distributed applications on the intranet/internet sector, in particular of systems and associated software for electronic commerce, is based on such discrete processes. By means of the invention it can be defined and optimized in a novel way. The resulting process models can be directly applied in a novel way to monitoring and system control.

STATE OF THE ART

Similar approaches for computer applications to processes are known from the field of control of industrial production processes, for example in the chemical industry. Such processes are most often describable by systems of equations, in particular differential equations, which are then reflected in a model and used in this way for control purposes. Also, nowadays building control systems are often computerized, and are designed by means of modelling and simulation.

For example, a paper (in several parts) by K. Pearson "Characterizing Complicated Systems" in SGA Bulletin No. 24 of December 1998, January and February 1999, published by the "Schweiz. Gesellschaft für Automatik/SGA" [Swiss Society for Robotics] deals with processes, more precisely with "model-based control . . . , particularly in the area of industrial process control . . . ". The article mentions a distillation process which can be described by approx. 350 differential equations. Obviously it is not possible to transpose with ease such an approach which is suitable for mathematically describable, continuous processes, to other processes, in particular to discontinuous processes which cannot easily be described mathematically.

U.S. Pat. No. 4,965,742 by Skeirik also describes a process control system where the modular software which implements process monitoring can be revised and altered by the user without interrupting monitoring. This allows flexible and, above all, rapid adaptation of process control to changed environmental conditions. However, this process control is intended for monitoring and controlling an essentially continuous process which, for example, can be mathematically described by a system of equations, if applicable, differential equations. However, such a system is unsuitable for so-called discrete processes, i.e. processes comprising a sequence of discrete events such as business processes, planning processes or development processes. Such processes cannot be controlled and monitored in the known way, and it is hardly possible to use sensors and actuators such as temperature sensors or control valves in a sensible way.

It is thus the object of the present invention to develop, optimize and automate such discrete processes which normally cannot be described by differential equations as is the case with continuous processes, but which instead comprise sequences of discrete elements or steps. Such processes can be quite complicated, as is the case for example in (technical) system sequences in information technology, e.g. in e-commerce. Processes (or sequences) in enterprises and other organisations, with only an indirect relation to technology, also belong to this category.

In summary, it is the object of the invention to provide an information technology system which is able to control, simulate, optimise and/or monitor discrete processes, i.e. sequences of discrete events.

THE INVENTION

Essentially, the invention can be described as an information technology system to control processes, in particular processes consisting of sequences of discrete events, whereby a process model corresponds to a real process or reflects a real process. The process model and the real process may be coupled using information technology, via at least one interface, preferably a standardized interface. Direct data exchange between the process model and the real process can now take place via this interface. Preferably a common standard format such as XML, a widely-used internet format, is used. Direct coupling using information technology obviates the need for any expensive and thus usually inefficient data conversion.

According to the invention, the process model cannot only be independent of the real process, but it can also be coupled to the real process. The former, i.e. independent operation, renders the system suitable for simulation of process modifications and/or for optimisation of the process; it is particularly advantageous if the real process should not or must not be interrupted. In such a case, process modification in the process model can be checked (without interrupting the real process) and if the modification was found to be successful it can be integrated in whole or in part in the real process by way of the interface.

As already mentioned, the system according to the invention also allows to couple the process model to the continuous real process, in that the process model, controlled via the interface, runs quasi parallel to the real process, i.e. receives relevant system state information. This allows permanent monitoring and control of the active real process. If the interface between the process model and the real process is bi-directional, it is even possible to assert a direct influence on the real process. In this way it is possible for example, for process modifications which have successfully been simulated in the process model, to be directly transferred to the real process, i.e. applied to the real process. Based on the system state at the time and observed input statistics it is also possible in many cases to determine what will happen in the future and what measures will have to be taken to bring about desired results.

For example, the invention may be applied with workflow management systems for which up to now no such closely coupled solutions exist. Such workflow management systems were, for example, described by S. Joosten, G. Aussems, M. Duitshof, R. Huffmeijer and E. Mulder in "WA-12: An Empirical Study about the Practice of Workflow Management", a research monograph of the University of Twente, ISBN 90-365-0683-2, 1994.

As has already been mentioned, the novel tool can also be used without direct coupling to a real process. Due to its simple and intelligent handling, it provides advantages when compared to known solutions. As will be shown below, in particular its structure and characteristics make it suitable to be transmitted as a so-called applet, if necessary together with the process model, via the internet or via an (enterprise-internal) intranet. The resulting practically instant propagation, adaptation or modification, together with the possibility of simultaneous access, provides entirely new possibilities. In particular the simultaneous and instant propagation or publication, via internet or intranet, of the dynamic models generated, allows completely novel application of information technology within enterprises and administrations. Details are provided in the embodiment of the invention described below.

According to the invention, the process models mentioned are created simply and graphically by connection with arrows, from already existing components and/or so-called standard elements. Such components may for example also be downloaded from an electronic catalogue from the internet or from an intranet. According to the invention, the components always comprise an environment so that they can be animated and thus checked for suitability, prior to their use.

The above-mentioned standard elements, i.e. the base modules for the user, by means of which the user him/herself can create new components, are made from a few fundamental base elements (at present 3 elements), so-called quarks. This significantly simplifies the preparation of customer-specific or application-specific sets or pallets of standard elements, without having to adapt the system itself.

While at present simple but rather academic examples of discrete event dynamic systems (DEDS) are the subject of scientific treatises, nevertheless entire enterprises or even parts thereof cannot be tackled with this theoretical approach, due to their complexities. In addition, for example, examination of enterprise processes is undertaken predominantly by economists who in turn are not particularly familiar with solutions that (technical) robotics has to offer. Thus, the tools in existence today are predominantly documentation aids which can be used to prepare extensive process documentation but which are hardly usable for design, optimization and control of the mentioned closely-coupled information technology systems. In order to analyse and optimise such DEDS systems, theoretically based models thereof, which can be simulated, are required.

The embodiment of the invention described below describes the integration of a new tool according to the invention in a workflow system or ERP (Enterprise Resource Planning) system. Such a tool not only serves to optimise a DEDS process, but also serves as a workflow design and workflow view tool which makes it possible to continuously monitor the system state and/or to adapt the system.

EMBODIMENT OF THE INVENTION

Figure 2:
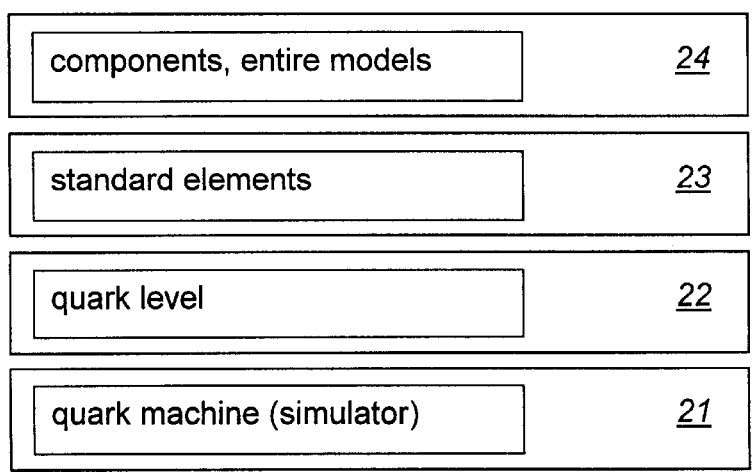
Figure 3:
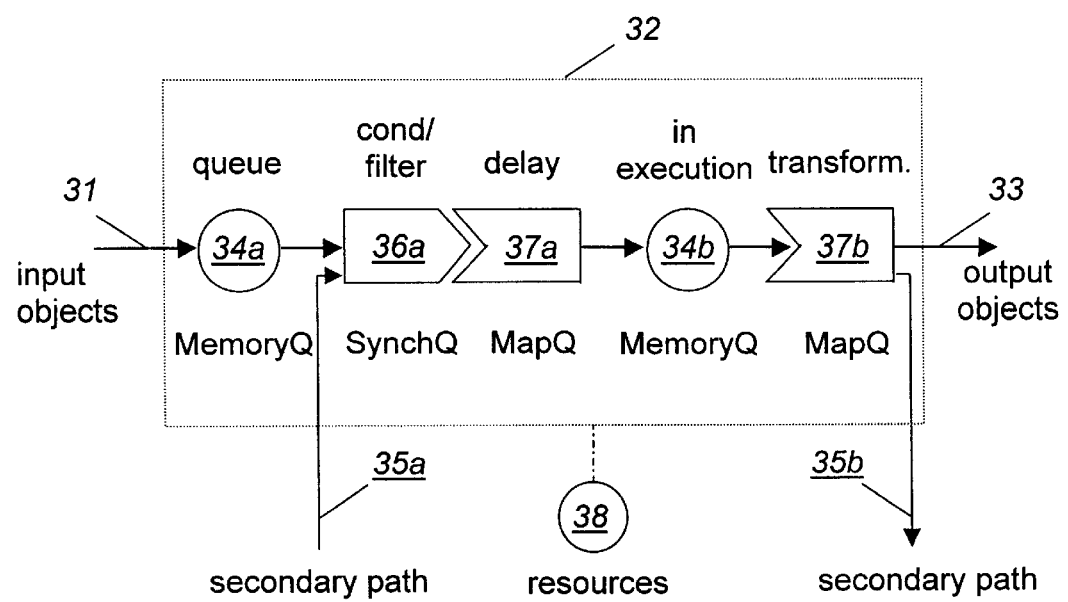

In the following, an embodiment of the invention is described together with associated drawings. In these show:

FIG. 1 an overview of a system according to the invention;

FIG. 2 various abstraction levels of the tool according to the invention;

FIG. 3 a standard element "step" defined by means of a "quark"; and

Figure 4:
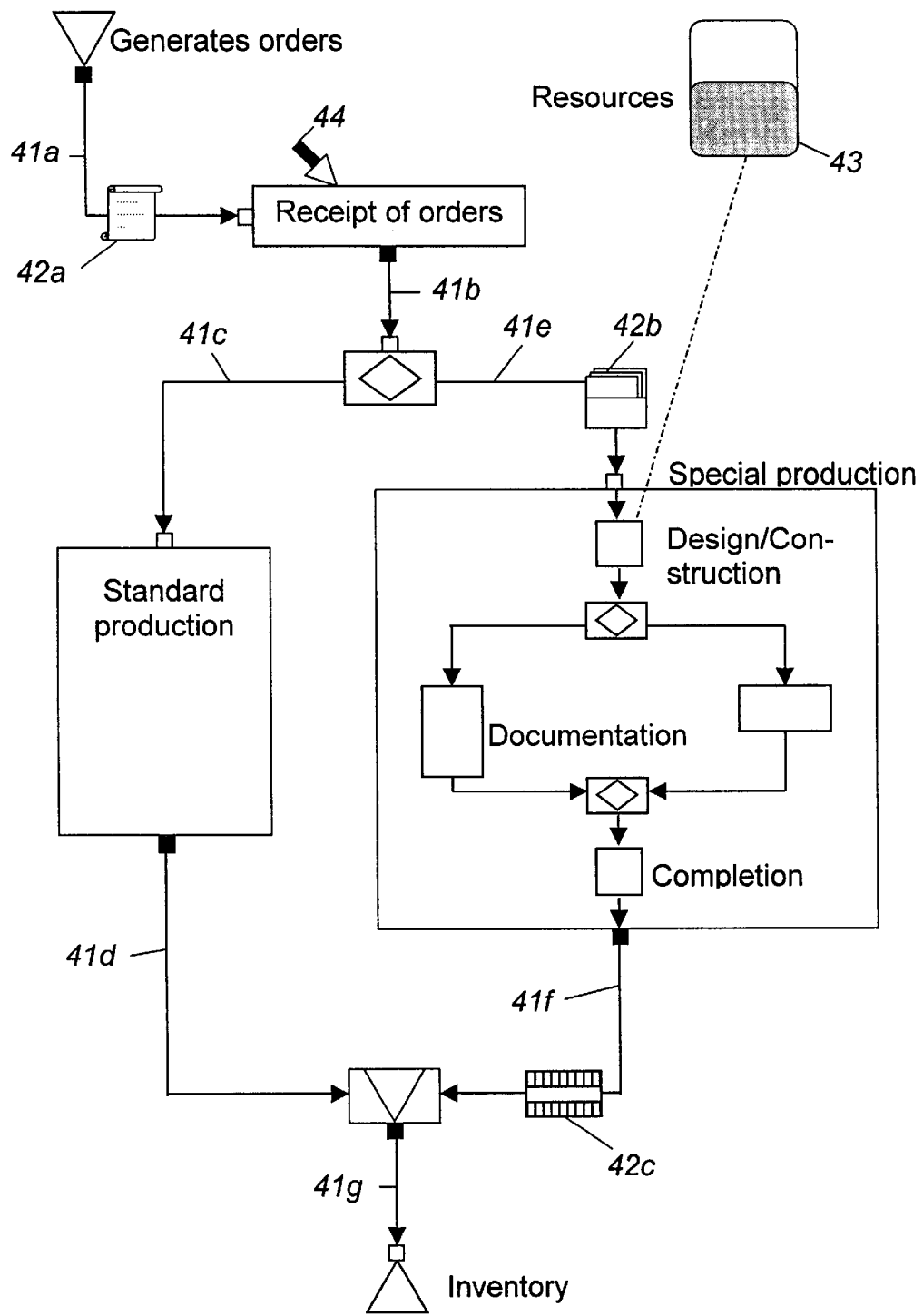

FIG. 4 a representation of the process on a display.

Below, an example of process modelling and simulation by means of the tool according to the invention is described. The formalism on which the new tool is based has its origin in the Petri nets, but this is only mentioned for the sake of completeness: it is not required for an understanding of the function. Such Petri nets are for example described by W. Reisig in "Petrinetze" [Petri nets], Springer Verlag Berlin, Heidelberg, 1982.

For the sake of clarity, a list of reference symbols has been provided.

| List of reference symbols | |
|---|---|
| FIG. 1 | |
| 1 | Simulator |
| 2 | Interface |
| 3 | Real process |
| 4 | Intranet/internet |
| 5 | Web server |
| FIG. 2 | |
| 21 | Quark machine |
| 22 | Quark level |
| 23 | Standard element level |
| 24 | Component level |
| FIG. 3 | |
| 31 | Input object(s) |
| 32 | Standard element |
| 33 | Output object(s) |
| 34a, 34b | Memory quark(s) |
| 35a, 35b | Secondary path(s) |
| 36a | Synchronisation quark(s) |
| 37a, 37b | Mapping quark(s) |
| 38 | Resource memory |
| FIG. 4 | |
| 41a to 41g | Arrows (object flow) |
| 42a to 42c | Objects to be processed |
| 43 | Resource memory with "fill level indicator" |
| 44 | Probe |

FIG. 1 is a diagrammic overview of a system according to the invention. The process model runs in the simulator 1 which is usually a computer or a computer network of suitable size and speed. The simulator 1 can be coupled to the real process 3 via one or several interfaces 2. Said process can for example be a technical development process in a design laboratory of an industrial enterprise or a process in a motor vehicle registration station, or the process of payment transactions in a bank.

The shown interfaces 2 transmit data in at least one direction; said data being sufficient to provide a synchronously running reflection of the real process in the simulator. Preferably however, the interfaces 2 are bi-directional thus enabling both data transmission from the real process 3 to the simulator 1 and from the simulator 1 to the real process 3. Both preferably take place via simple data exchange, e.g. by means of XML documents, as mentioned above, i.e. the process model data is for example directly transmitted as an XML document from the simulator 1 to the real process 3. Conversely, the real process 3 can return XML data to the simulator 1. Thus in the first direction the behaviour of the real process is influenced while during feedback a depiction of the state takes place from the real process 3 to the simulator 1.

As a result of adaptability of the new tool to the system implementing the real process, combined with the simple export of process model data, e.g. as an XML document, simple and efficient coupling between the simulated process model and the real process is achieved without the need for a complex interface to handle data conversion in both directions. In particular when the internet standard XML is used, the two partial systems can also be coupled directly via the internet.

The interfaces can also be configured so as to be able to be influenced. In this way, depending on the desired function, either monitoring of the real process or simulation decoupled from the real process or influencing the real process from the process model are possible, right up to complete control of the real process by the process model. It is also possible to combine these three basic operational modes. Overall, the system according to the invention represents a completely novel software tool to simulate and/or optimize and/or control and influence real processes of discrete events.

Visualisation of both a process to be simulated and a real process takes place via graphical representation of the process model which can be animated and thus easily made comprehensible by means of simulator 1. The process model in simulator 1 can for example also be exported as a Java applet and can thus be published in dynamic form on the intranet/internet 4 via a web server 5. In this way, the model can be downloaded at practically any desired location to an internet browser and can be animated or simulated therein. If, for example, in the model applet on the web server 5, the state of the real process is continuously updated, then this information is also made available via the intranet/internet 4 at any location to any desired number of people.

As has already been suggested above, preferably the process models simulated in the simulator 1 can entirely or partly comprise components which for example have been sourced from an electronic catalogue via the intranet/internet 4. Newly created components can then in turn be stored again in the said catalogue via said intranet/internet 4.

FIG. 2 shows the abstraction levels of the new tool. Right at the bottom is the "quark machine" 21 (the term "quark" was borrowed from physics; here it is used in the sense of "smallest basic building block or module"), i.e. the machine with which the elementary modules, the quarks, are simulated. Usually, these quarks are not accessible to the user, they are exclusively used to define standard elements used by the user to construct his/her models or model component. The simulation carried out by the tool is based on these quarks; simulation practically takes place on quark level 22. For this reason, there is no need to change the simulator when a new palette of standard elements (from these quarks) is defined. In the exemplary embodiment shown, only three quarks are necessary for efficient definition of the required standard elements.

The three quarks used here are described in more detail below in the context of FIG. 3 which shows a standard element "Step" composed of such quarks: the memory quark (MemoryQ), the synchronisation quark (SynchQ) and the mapping quark (MapQ).

In the workflow area those standard elements will now be defined which are necessary for the desired simulation or modelling of a particular workflow system. This is the next higher level 23 in FIG. 2. Several standard elements are now combined to form a so-called element palette in the tool. Model components—level 24—can be prepared with said element palette. Apart from standard components, new components can also contain already existing components. For example, it is possible to integrate so-called JavaBeans into these novel graphic model components which in this document are also referred to as "IvyBeans". JavaBeans are software components written in Java (a programming language developed by SUN Microsystems; see e.g. "The Java Programming Language" by Arnold Gosling, Addison Wesley, 1996, or "How to program JavaBeans" by P. Coffee, M. Morrison, R. Weems, J. Leong, ZD Press, 1997).

IvyBeans provide the considerable advantage that in the tool they can immediately be linked together to form complex process modules; the decisive advantage of JavaBeans consists of their increasing number and good availability across the internet.

Normally a process model will comprise standard elements, IvyBeans and possibly JavaBeans, as suggested in the uppermost abstraction level of FIG. 2.

Below, structure and function of a standard element are explained in more detail with reference to FIG. 3. FIG. 3 shows the standard element "Step" 32, i.e. an individual activity within a typical workflow process. From at least one input object 31, e.g. an order, this activity generates transformed output objects 33, e.g. a machinery component or a document, usually by using one or several resource objects, e.g. from a resource memory 38. Incoming input objects 31 are placed in an input queue 34a. Via a first secondary path 35a other objects, e.g. data objects, can be accessed in a memory (not shown), for processing, or can be stored in such a memory via a further secondary path 35b.

As already mentioned above, only three quarks are required for definition of the process step to be carried out in this standard element 32: the memory quark (MemoryQ), the synchronisation quark (SynchQ) and the mapping quark (MapQ). Below, the functions of these quarks are described in more detail.

MemoryQ 34a: This first quark models the input queue, i.e. reflects it. The capacity determines the possible length of the queue, while the delay determines the waiting time.

SynchQ 36a: This synchronisation quark synchronises the objects 31 and 35a which are present at the inputs of the standard element, i.e. these objects must be present simultaneously for this step to be able to be carried out. In addition, by filtering, a selection of the objects 31 present in the queue and awaiting processing can be made, for example by filtering out from the queue and processing object 31 with the highest value of a specified attribute. Resources are now reserved, e.g. in a resource memory 38, i.e. the respective resource is blocked to prevent it from simultaneously being used by another activity. By way of the already mentioned secondary path 35a, in addition data objects can be brought for processing from a data memory (not shown) to the standard element.

MapQ 37a: This first mapping quark determines the time provided for processing and also the delay incurred by processing.

MemoryQ 34b: This second memory quark determines the number of objects which can be in execution at the same time. The capacity and delay of this memory determine the degree of simultaneous execution (e.g. number of parallel workplaces) and the time required for carrying out this step.

MapQ 37b: This second mapping quark transforms the attribute values of the input object, i.e. "produces" the desired output object. It also releases the resources used, e.g. from the resource memory 38. In addition this quark has output conditions which are not used for the element "Step" but which may be required to define other standard elements.

To summarize: by means of the standard element 32 shown in FIG. 3, a relatively complex element can be implemented in software by intelligent application of a few elementary modules, the so-called quarks. The advantages for both implementation and simulation of this universally applicable approach are evident: with only a few quarks (three in this embodiment) all tasks encountered can be solved, i.e. modelling options can be changed without the need for changing the simulator.

On the next abstraction level 24, compare FIG. 2, components are composed from such standard elements, if necessary together with other defined components, so-called "IvyBeans". JavaBeans suitable for the present application can also be integrated into the model.

The computer-controlled composition of a component takes place by means of the graphic tool editor by simple connection and completion of given masks, e.g. for numeric value inputs.

Components can be generated top-down, i.e. by progressive summarisation of a flat simulation model, or bottom-up, i.e. certain components are first created (or obtained from the component catalogue) and then used for constructing a model or part of a model.

After composing a component (by selecting a respective menu item) said component can be placed into a catalogue for future re-use. It is also possible, in the context of object-oriented programming, to obtain parametrisable instances thereof. The components present in the catalogue can be seen by the user in an element palette on screen. They can be inserted into the model just as easily as standard components and can be connected by arrows.

By means of the components, the representation of a process and thus to an extent the process itself, can be hierarchically structured, with the uppermost view usually only showing the components. Such a view is shown in FIG. 4 which is briefly described below.

In the view of a graphic process model shown in FIG. 4, the object flow progresses via arrows 41a to 41g. Each of the objects 42a to 42c forms part of an object class and represents a reality which in the real process is executed or processed, i.e. used. For example on a typical control path these are often events, messages, instructions. From these, new events, documents, partial products etc. are created, usually in conjunction with resources. An order generator forms the input, while there is a simulated stockroom or warehouse at the end.

One of the resources from the resource memory 43, e.g. an employee or a device, can be reserved for a step (e.g. receipt of order) and can be released again on completion. This will be discussed below.

Each object comprises one or several attributes whose number and type are determined in an object class. The values of these attributes can be changed in the process. For example in a step the attribute process time can be increased by the time required for execution, or costs can be continuously added to a cost attribute, for example for process cost acquisition.

Typical attributes of resource objects include cost unit rate, qualification, accumulated time (e.g. in the case of an employee) or in case of a tool resource: maximum load, downtime, action time etc. The ability to enter expressions on an associated mask, similar to the use in spreadsheet programs, makes possible almost any desired transformation of the attribute values.

By means of an arrow, resource memories can also be linked directly, thus making it possible to specify a hierarchical organisation of resources: if a resource from a memory on a higher level is desired, the entire subordinate tree of memories is checked for the desired resource.

The component "special production" of the example shown in FIG. 4 is shown in the so-called transparent mode, i.e. the user can virtually look into the component and recognise the three standard elements "construction", "documentation", and "completion". In the step masks which can easily be opened via contextual menu, the user can for example define queue time, execution time and/or value transformation. In so doing, the user need not have any knowledge of the definition of the standard elements by means of quarks, as described above.

As already mentioned, in FIG. 4 a further resource memory 43 for employees is modelled as an example. As is suggested by its dotted connecting line to the standard element "construction", the resource memory 43 is quasi controlled by this standard element. Any given construction task which requires process time, i.e. the use of a construction engineer, reduces the "fill level" of the resource memory 43. This continuous display of capacity utilisation of particular user-definable resources makes for fast and accurate planning because it can be seen at a glance whether a process imposes light or heavy utilisation on particular resources or whether, possibly, resources may be exhausted.

As a further adjunct with direct visual access, temporal changes of the queue during receipt of orders can be graphically represented in bar charts or other diagrams (not shown in FIG. 4). To display such simulation results it is sufficient to insert a probe 44 into the element to be registered, using the mouse. Similarly, attribute values of objects in an element can be displayed in this way. Such a probe can easily be specified by a so-called I/O wizard.

The described simulation model allows simultaneous optimization of process sequence and resource allocation. The majority of today's information technology systems really represent DEDS and can be outstandingly modelled and specified with a tool such as IvyFrame. The result is an executable specification which in a clear and precise form shows how the entire system should behave, with its dynamics being easily communicable.

The present embodiment of the invention is completely implemented in Java and thus makes possible simple and elegant export of the process models as Java applets which can be animated directly by means of an internet browser. In this way it is possible e.g. within a firm to make accessible even complex processes via intranet, quasi a kind of dynamic intranet/internet publication. In particular in the case of large enterprises or users with a widely dispersed organisation, for example a large administration with many regional offices, even complex processes to be executed can be made accessible simply, fast and reliably in this way.

In addition, any desirable documents can be associated with the process elements, i.e. practically unlimited help functions can be provided. For example, by a mouse click the user can at any time call up relevant information concerning the respective process step. The (simulated) process is so-to-speak in the centre of any further information procurement.

As has already been explained above, realisation and auto-mation of the process takes place via a respective information technology system with an XML interface (for example as described by Simon St. Laurent in "XML—A Primer", MIS Press, 1998) between the simulator or process model and the real process. As explained, in this way it is possible to integrate the system according to the invention as a control and monitor packet. The resulting quasi model-based "feed forward control" provides unique advantages: such an approach, e.g. in workflow planning systems or enterprise resource planning systems (ERP systems) creates easily-configurable, adaptive solutions whose dynamic is only defined by the process model. This makes the system according to the invention a very clear, easily-operable and extraordinarily easy-to-manage tool for the user or users.

What is claimed is:

1. An information technology system for designing and optimizing a computerized business or workflow real process of discrete events, comprising:

a process model graphically picturing said discrete events of said real process on a display, said process model and said real process being coupled using an information technology interface;

said process model being operable alternatively either
(a) independently of said real process as simulation engine for designing and/or optimizing said process model or
(b) connected to said real process for implementing said discrete events of the process model selectively into said real process whereby
said process model provides an animated representation of said real process and is constructed from components visually representing the discrete events, which components animate the object flow in the process by visual connection in said process model and include predefined standard elements and/or application-specific elements being available from an electronic catalogue via a network, said standard elements and/or application-specific elements comprising one or more fundamental base elements.

2. The information technology system according to claim 1, wherein
the animated representation of the modelled process is representable and/or exportable in the form of a Java applet.

3. The information technology system according to claim 1, wherein
the predefined standard elements or application-specific elements comprise few, preferably three, fundamental base elements.

4. The information technology system according to claim 1, wherein
the network from which the components of the process model are available from an electronic catalogue is an intranet/internet network.

5. The information technology system according to claim 1, wherein
the interface connecting the process model and the real process is an XML interface.

6. The information technology system according to claim 1, wherein
the interface is bi-directional so that
(a) the process realized in the process model is entirely or partly integratable into the real process, and
(b) a real process is partly or entirely transferred into the process model.

7. The information technology system according to claim 1, wherein
the process model monitors the real process, in particular as a real-time monitor of the real process.

8. A method for modeling, simulating, optimizing and/or controlling a computerized real business or workflow process wherein a computerized model of said real process graphically displays discrete events of said real process, comprising:
(a) graphically designing and testing a model of said real process by modeling and/or simulating the desired real process,
(b) via at least one interface connecting said model and said real process,
(c) implementing said process model as said real process,
(d) running said implemented real process,
(e) monitoring the behavior of said implemented real process to detect errors and/or weaknesses, and, depending whether such errors and/or weaknesses were detected,
(f) disconnecting said interface,
(g) optimizing and/or simulating desired improvements in said model,
(h) reconnecting said interface, and/or
(i) implementing said improved model selectively or fully as said real process whereby
said process model is constructed from components visually representing the discrete events, which components include predefined standard elements and/or application-specific elements being available from an electronic catalogue via a network, said standard elements and/or application-specific elements consisting of or comprising fundamental base elements.

9. The method according to claim 8, wherein at least some of the method steps are continuously repeated for a permanent optimization of the real process.

* * * * *